(12) United States Patent
Sheehan et al.

(10) Patent No.: US 6,509,891 B1
(45) Date of Patent: *Jan. 21, 2003

(54) ERGONOMIC MOUSE DEVICE

(75) Inventors: Peter Sheehan, Bray (IE); Cathal Loughnane, County Tipperary (IE); David M. Rempel, Kensington, CA (US)

(73) Assignees: Logitech Europe S.A. (CH); The Regents of the University of California, Oakland, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/510,725

(22) Filed: Feb. 22, 2000

Related U.S. Application Data

(63) Continuation-in-part of application No. 29/118,497, filed on Feb. 9, 2000, now Pat. No. Des. 439,253, and application No. 29/118,536, filed on Feb. 9, 2000, now Pat. No. Des. 435,848.

(51) Int. Cl.⁷ .................................................. G09G 5/08
(52) U.S. Cl. ........................ 345/167; 345/163; D14/409
(58) Field of Search ................................ 345/156, 157, 345/163, 167; 341/20; D14/114, 115.1, 117.2, 117.3

(56) References Cited

U.S. PATENT DOCUMENTS

| 4,862,165 | A |   | 8/1989  | Samuel ........................ 341/20   |
| D350,737  | S |   | 9/1994  | Chen ......................... D14/114   |
| 5,414,445 | A | * | 5/1995  | Kaneko et al. .............. 345/163     |
| D374,867  | S | * | 10/1996 | Canavan ..................... D14/114    |
| 5,576,733 | A | * | 11/1996 | Lo ............................... 345/163 |
| D377,486  | S | * | 1/1997  | Shih et al. .................. D14/114   |
| D377,487  | S |   | 1/1997  | Shih et al. .................. D14/114   |
| 5,726,683 | A | * | 3/1998  | Goldstein et al. ........... 345/163     |
| D401,919  | S | * | 12/1998 | Chiang ....................... D14/114   |
| 5,894,302 | A |   | 4/1999  | Scenna et al. .............. 345/163     |
| D411,837  | S | * | 7/1999  | Sheehan ..................... D14/114    |
| 6,005,553 | A | * | 12/1999 | Goldstein et al. ........... 345/163     |
| D423,488  | S | * | 4/2000  | O'Keeffe et al. ....... D14/117.3        |
| D430,568  | S | * | 9/2000  | Leaf et al. ................. D14/403    |
| D435,848  | S | * | 1/2001  | Sheehan et al. ........... D14/408       |

* cited by examiner

*Primary Examiner*—Kent Chang
(74) *Attorney, Agent, or Firm*—Townsend and Townsend and Crew LLP

(57) ABSTRACT

A pointing device provides increased comfort by supporting the user's hand to avoid extreme positions of posture ranges of the various fingers and joints of the hand and wrist. The device includes an upper surface having a crown on which to rest a palmar region of the palm of the hand of a user substantially at the metacarpal-phalangeal (MP) joint of the second digit and at least a portion of the metacarpal-phalangeal joint of the third digit. The upper surface has a front region on which to rest the second and third digits. The front region extends downwardly from the crown in a forward direction. The upper surface includes a back region on which to rest the hypothenar region of the hand. The back region extends downwardly from the crown in a rearward direction, and is configured to substantially avoid contacting the carpal tunnel and to substantially avoid supporting the thenar region of the hand. The housing further includes an inner side surface on which to place the thumb, and an outer side surface on which to place the fifth digit and possibly the fourth digit.

33 Claims, 6 Drawing Sheets

ERGONOMIC MOUSE DEVICE

This application is a continuation-in-part of and claims the benefit of commonly assigned U.S. patent application Ser. No. 29/118,497, now U.S. Pat. No. D439,253, entitled "Ergonomic Mouse", filed Feb. 9, 2000 and U.S. patent application Ser. No. 29/118,536, now U.S. Pat. No. D 435,848 entitled "Ergonomic Mouse", filed Feb. 9, 2000. The disclosures of these applications are incorporated herein by reference.

BACKGROUND OF THE INVENTION

This invention relates generally to pointing devices and, more particularly, to an ergonomic pointing device.

Pointing devices such as computer mouse devices are commonly used, for example, to control cursor movement on a computer screen. The use of pointing devices often involves highly repetitive hand and finger movements and positions. Some forms of repetitive stress disorder may be attributed to the use of pointing devices, particularly where awkward and stressful movements and/or positions are involved. Pointing devices having configurations that force the wrist, hand, and fingers of the user to assume awkward and stressful positions and/or movements are undesirable.

Existing mouse devices have evolved with ergonomic considerations in mind. Assignee's own U.S. Des. Pat. No. 411,837 shows a shape that guides the hand away from full pronation.

U.S. Pat. No. 4,862,165 to Gart discloses a mouse having an arched metacarpal-phalangeal support surface for supporting the anterior surface of the hand and a concave thenar pad support surface for supporting the thenar pad of the hand.

U.S. Pat. No. 5,726,683 to Goldstein et al. discloses a mouse having a top surface, a right side surface, and a substantially vertically rising left side surface. The top surface has a negative slope from front to rear in a range of 15–30° and from left to right in a range of 20–30°, and provides at the front of the top surface a phalanx support. The top surface includes a peak running from front to back oriented to lie under the operator's thenar eminence providing support thereto and a surface through which the operator can push the mouse with his or her thenar eminence.

U.S. Pat. No. 5,576,733 to Lo discloses a mouse having an upright, primary finger-supporting surface for supporting all of the fingers of an upright hand in straight positions and in an upright stack. The mouse includes an opposite thumb-supporting surface for supporting the thumb.

U.S. Pat. No. 5,894,302 to Scenna et al. Discloses a mouse including an upper surface having a hump for supporting the triangular area of the hand encircled by the thenar region, the hyperthenar region, and the region below the metacarpal-phalangeal joints. The upper surface includes a tail having a rising portion to underlie and bear the pressure of the region of the user's hand where the thenar and hyperthenar converge. The finger buttons in the front are elevated above the hump.

U.S. Pat. No. 5,414,445 to Kaneko et al. Discloses a mouse including a top surface having a bulge for supporting the metacarpal-phalangeal joint ridge. The mouse supports the hand such that the wrist rests on the working surface on which the mouse is disposed.

SUMMARY OF THE INVENTION

The present invention is directed to a pointing device that improves upon the prior art with a unique combination of features and new modifications to provide increased comfort to the user. The invention does so by providing a pointing device that supports the user's hand to avoid extreme positions of posture ranges of the wrist and the fingers and joints of the hand such as, for example, wrist extension, full pronation of the hand, and abduction or adduction of the thumb. The device is further configured to reduce pressure applied to the carpal tunnel, and to minimize contact pressure on the sensitive areas of the wrist by elevating it above the working surface. As a result, the pointing device tends to promote more relaxed hand and wrist posture, minimize static muscle loading, and reduce physical stresses during operation of the pointing device.

In accordance with an aspect of the invention, a pointing device for use on a working surface includes a bottom configured to be placed on the working surface, and at least one finger-operated pointing member. In a specific embodiment, the pointing device is a computer mouse device.

The device includes an upper surface having a crown for contacting a palmar region of the palm of the hand of a user substantially at the metacarpal-phalangeal (MP) joint of the second digit and desirably at least a portion of the MP joint of the third digit. The crown is higher in elevation than remaining portions of the upper surface relative to the bottom. Because one of the more repetitive tasks in operating the device entails pressing buttons using the second and/or third digits which involves movements mainly around the MP joints of those digits, the crown advantageously provides primary support from those MP joints toward the wrist.

The upper surface extends from the crown downwardly in a forward direction toward the tips of the second and third digits to form a front region, downwardly in a rearward direction toward the wrist of the user to form a back region, downwardly in an inward direction toward the thumb to form an inside region, and downwardly in an outward direction toward the MP joints of the fourth and fifth digits to form an outside region. A transverse hump extends from the crown in the outward direction for contacting a palmar region substantially at the MP joints of the fourth and fifth digits (and possibly a portion of the MP joint of the third digit). The transverse hump slopes downwardly from the crown to guide the hand away from full pronation. The back region supports the hypothenar region of the hand.

The crown and the back region preferably are sufficiently high relative to the bottom to maintain the wrist above the working surface to promote a near-neutral wrist position with little or no wrist extension, and to minimize contact pressure against sensitive areas of the wrist due to prolonged contact with the working surface.

The back region slopes downwardly with a sufficiently large curvature in the rearward direction to substantially avoid contacting the carpal tunnel region of the palm, thereby reducing pressure on the carpal tunnel. For example, the back region is typically configured to avoid contacting at least the middle and proximal portions of the carpal tunnel but may contact the distal portion of the carpal tunnel. In a specific embodiment, the back region has a greater curvature in the rearward direction than the front region in the forward direction.

The back region includes a "thenar void" to substantially avoid supporting the thenar region, so that the thumb is allowed to hang down in a substantially neutral thumb position and to move freely relative to the pointing device. This eliminates pressure and loading on the thenar region due to interference from a thenar support found in conventional mouse devices.

The crown and the back region desirably are sufficiently high in elevation to allow the distal phalange of the thumb to rest on the working surface in a rest position between the extreme positions of adduction and abduction. In a specific embodiment, the thumb is about half-way between adduction and abduction.

The front region may include buttons on which to place the second and third digits. The buttons are desirably aligned with the phalanges of the second and third digits, respectively. In this way, the digits can operate the buttons efficiently by pressing downward in a substantially neutral position without awkward or strained movements (i.e., abduction or adduction).

In some embodiments, the housing includes an inner side surface on which to place the thumb, and an outer side surface on which to place the fifth digit and possibly the fourth digit. The inner side surface includes an upper region with an inverted surface portion to face downwardly toward the distal phalange of the thumb. The outer side surface includes an upper region with an inverted surface portion to face downwardly toward the distal phalange of the fifth digit (and possibly the distal phalange of the fourth digit). The inverted surface portions provide convenient contact locations for the thumb and the fifth digit (and possibly the fourth digit) to lift the pointing device, thereby reducing the gripping or pinching force when the mouse is lifted. The device desirably has a center of gravity disposed between the inverted surface portion of the inner side surface and the inverted surface portion of the outer side surface. In this way, the device will remain level without tilting in the front-to-back direction during lifting by the hand.

DESCRIPTION OF THE SPECIFIC EMBODIMENTS

Figure 1:
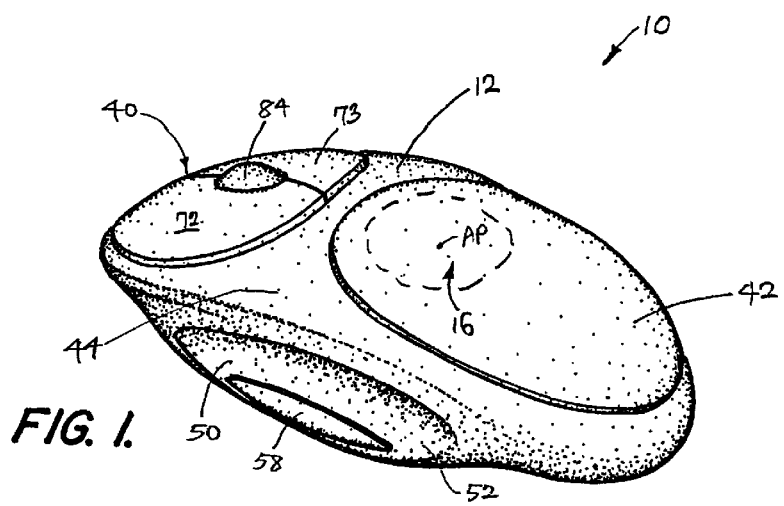
FIG. 1 is a perspective view of a mouse device in accordance with an embodiment of the present invention.

FIGS. 1–7 show the housing of a mouse device 10 having at least one finger-operated pointing member. The mouse 10 includes an asymmetrical upper surface 12 and a bottom 14 that typically is generally flat for operating on a flat working surface. The upper surface 12 has a crown 16 that is desirably rounded and disposed for contacting a palmar region of the palm of the hand of the user. The crown 16 is higher in elevation than remaining portions of the upper surface 12 relative to the bottom 14. The mouse device 10 of FIGS. 1–7 is configured for a right-handed user, but it is appreciated that the principles of the present invention can be used for constructing a mouse for a left-handed user (e.g., a mirror image of the embodiment shown).

Figure 8:
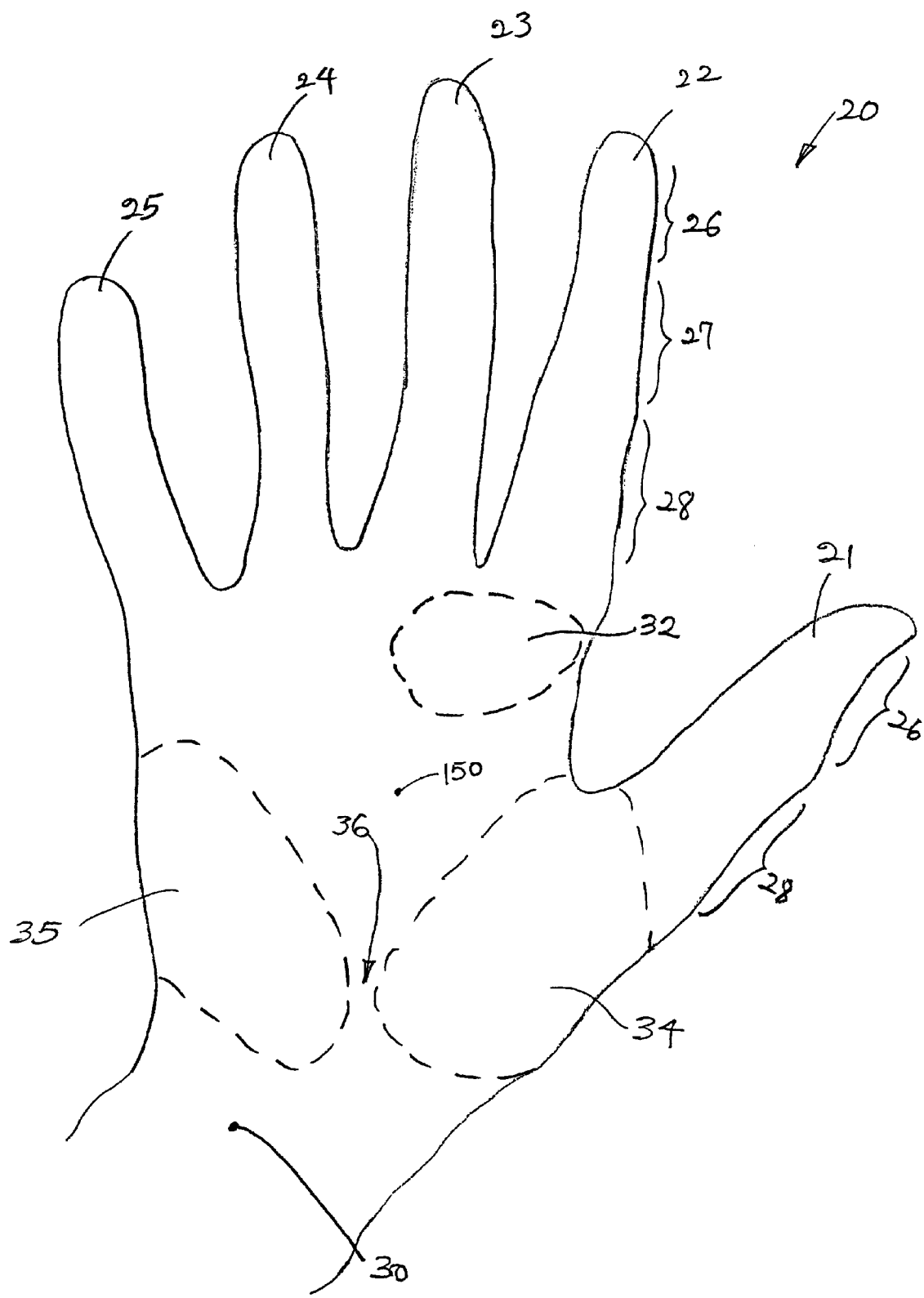
FIG. 8 is a schematic view of a hand illustrating the palm and surrounding regions.
Figure 9:
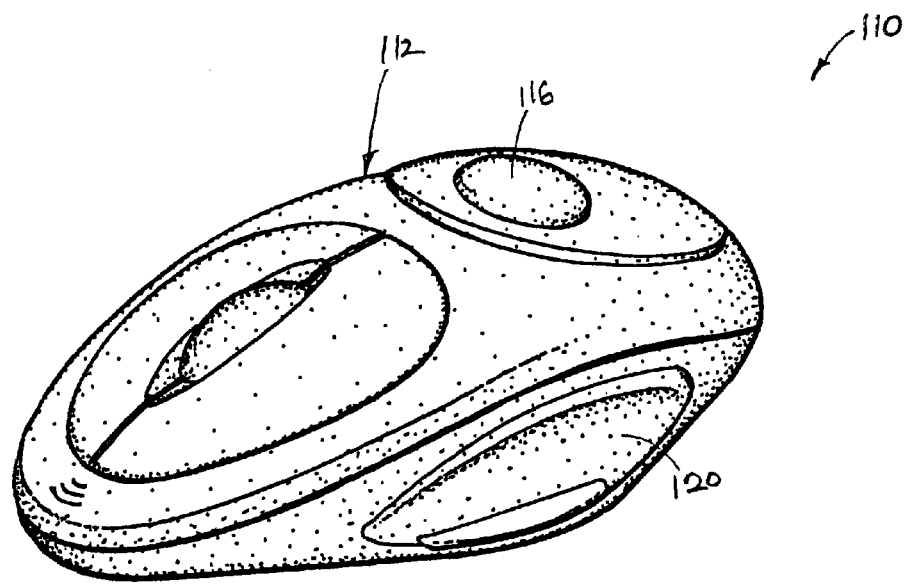
FIG. 9 is perspective view of a mouse device in accordance with another embodiment of the present invention.
Figure 10:
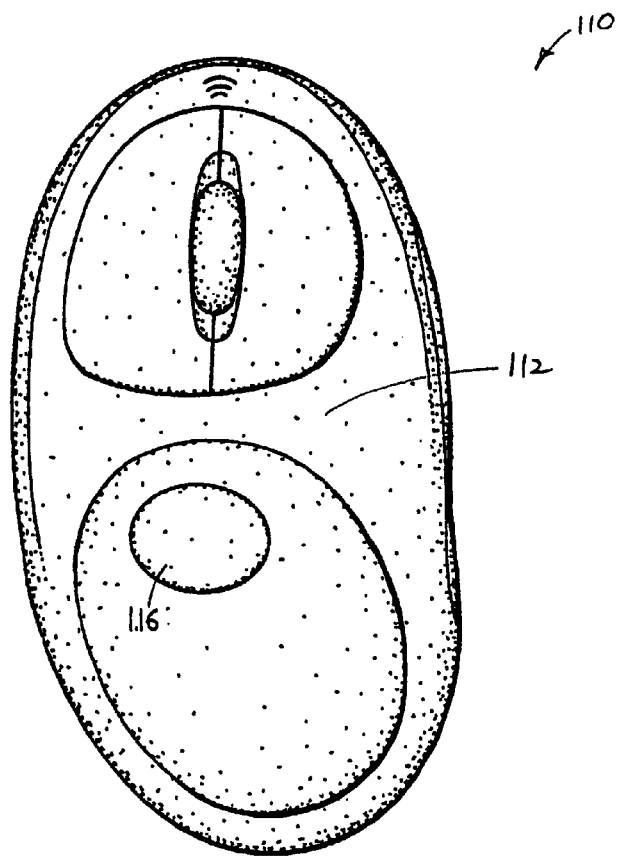
FIG. 10 is a top plan view of the mouse device of FIG. 9.
Figure 11:
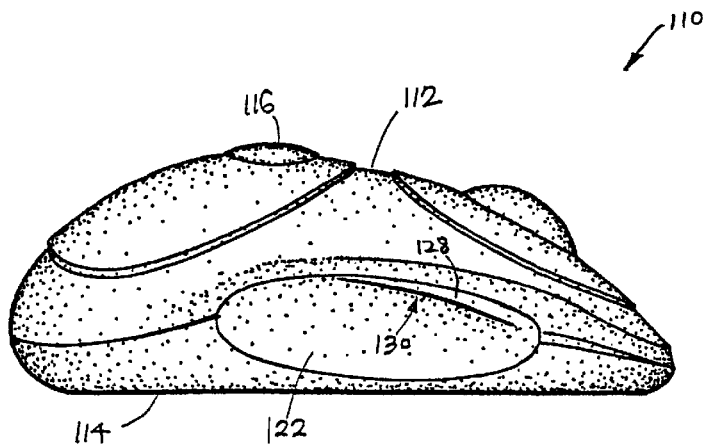
FIG. 11 is a right side elevational view of the mouse device of FIG. 9.
Figure 12:
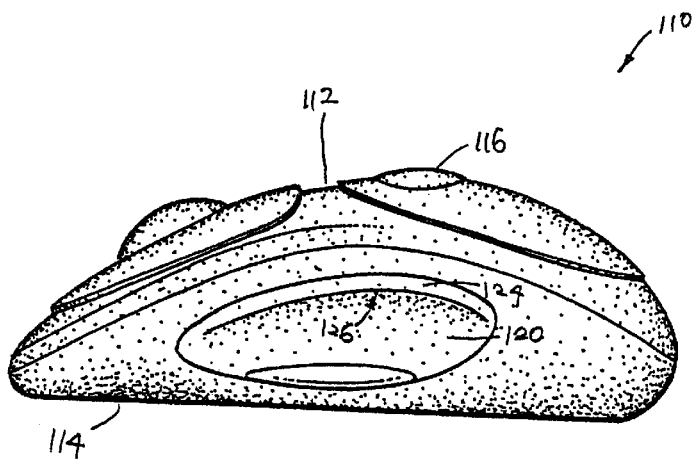
FIG. 12 is a left side elevational view of the mouse device of FIG. 9.
Figure 13:
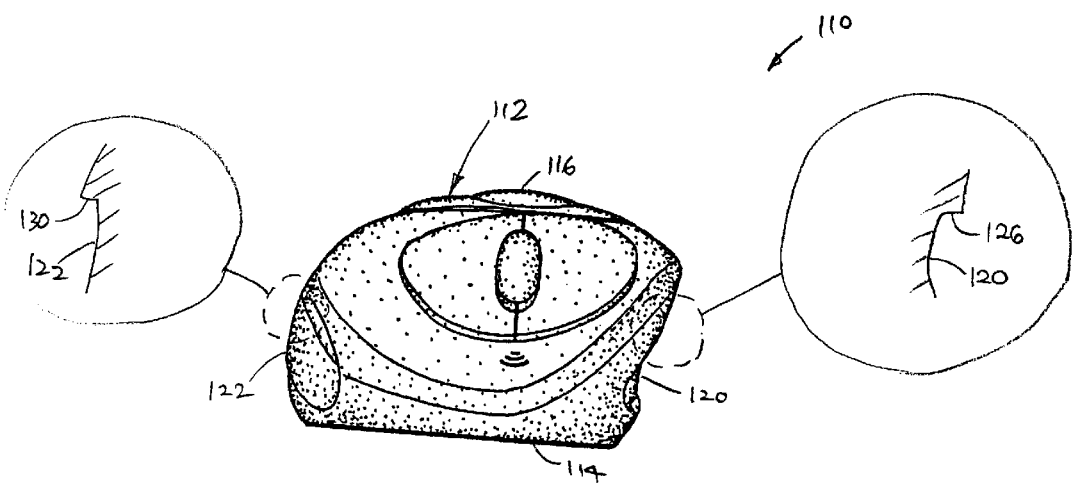
FIG. 13 is a rear elevational view of the mouse device of FIG. 9.

FIG. 8 shows a right hand 20 having a first digit or thumb 21, second digit 22, third digit 23, fourth digit 24, and fifth digit 25. Each of the second through fifth digits 22–25 has three phalanges, including a distal phalange 26, a middle phalange 27, and a proximal phalange 28. The thumb 21 has a distal phalange 26 and a proximal phalange 28. The metacarpal and carpal bones extend between the five digits 21–25 and the wrist 30. The MP joints of the digits 21–25 are located between the proximal phalanges 26 of the digits 21–25 and the corresponding metacarpals. FIG. 8 shows a contact region 32 substantially at, typically just below, the MP joints of the second and third digits 22, 23. More desirably, the contact region 32 is just below the MP joint of the second digit 22 and a portion of the MP joint of the third digit 23. The crown 16 of the mouse device 10 in FIGS. 1–7 is configured to contact and support the contact region 32 of the user's hand 20. Accordingly, the crown 16 is asymmetrically located inwardly to the left side of the upper surface 12 of the mouse 10.

As shown in FIG. 8, at the base of the thumb 21 is the thenar region 34, while on the other side of the palm is the hypothenar region 35. The carpal tunnel 36 is disposed between the thenar region 34 and hypothenar region 35.

As shown in FIGS. 1–7, the upper surface 12 slopes from the crown 16 downwardly in a forward direction to a front region 40, which is provided for supporting the distal portions of the second and third digits 22, 23 and optionally the fourth digit 24. The upper surface 12 slopes from the crown 16 downwardly in a rearward direction to a back region 42 oriented toward the wrist 30. The upper surface 12 slopes from the crown 16 downwardly in an inward direction to an inside region 44 oriented toward the thumb 21 on the left side of the hand 20, and slopes from the crown 16 downwardly in an outward direction to an outside region 46 oriented toward the MP joints of the fourth and fifth digits 24, 25 on the right side of the hand 20. The rounded crown 16 with downward slopes in different directions toward the bottom 14 allows pivoting of the hand 20 and flexion of the hand 20 in a more neutral position, away from extreme positions of the posture ranges and with reduced static loading on the various joints of the hand 20. The upper surface 12 may include a surface texture that minimizes sliding of the hand.

Figure 2:
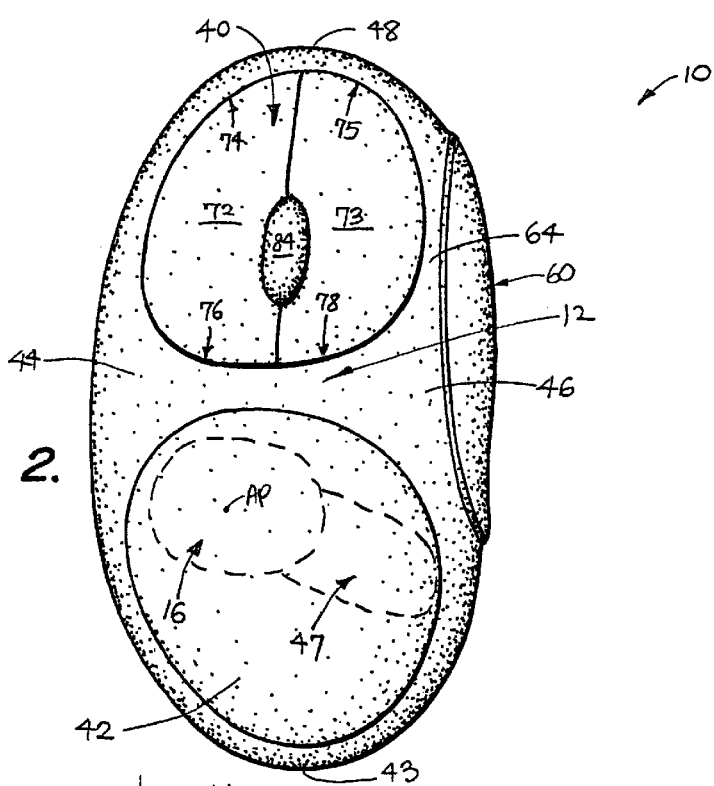
FIG. 2 is a top plan view of the mouse device of FIG. 1.
Figure 4:
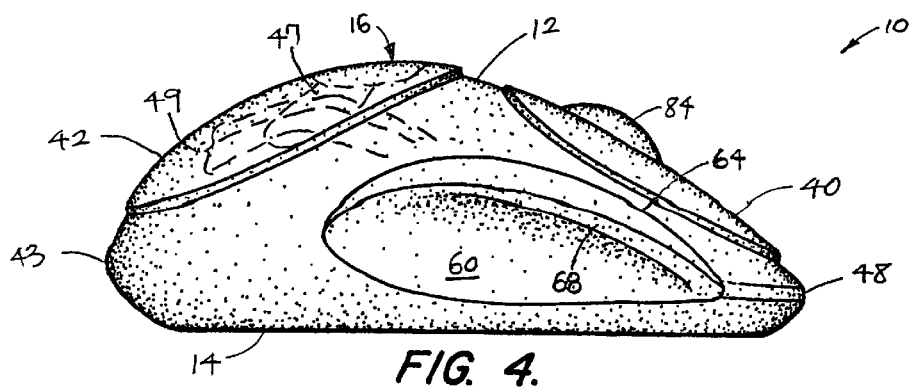
FIG. 4 is a right side elevational view of the mouse device of FIG. 1.

The contour between the front region 40 and the back region 42 forms a transverse hump 47 extending from the crown 16 outwardly to the outside region 46, which is shown in FIGS. 1, 2, and 4. As best seen in FIG. 4, the contour of the outside region 46 can be represented by a series of arches 49 oriented in the direction between the front and back of the device 10. The transverse hump 47 covers an area overlying the peaks of the arches 49.

The crown 16 provides the primary support for the hand 20, and bears substantial surface pressure, particularly during large movements of the mouse 10. The crown 16 supports the hand 20 at the contact region 32 substantially at the MP joint of the second digit 22 and at least a portion of the MP joint of the third digit 23. The MP joints of the fourth and fifth digits 24, 25 (and possibly a portion of the MP joint of the third digit 23) rest substantially along the transverse hump 47 extending from the crown 16 outwardly to the outside region 46. The transverse hump 47 is not oriented in a straight left-right direction. Rather, the outward portion of the transverse hump 47 curves toward the back region 42 to conform to the shape of the hand 20.

Figure 3:
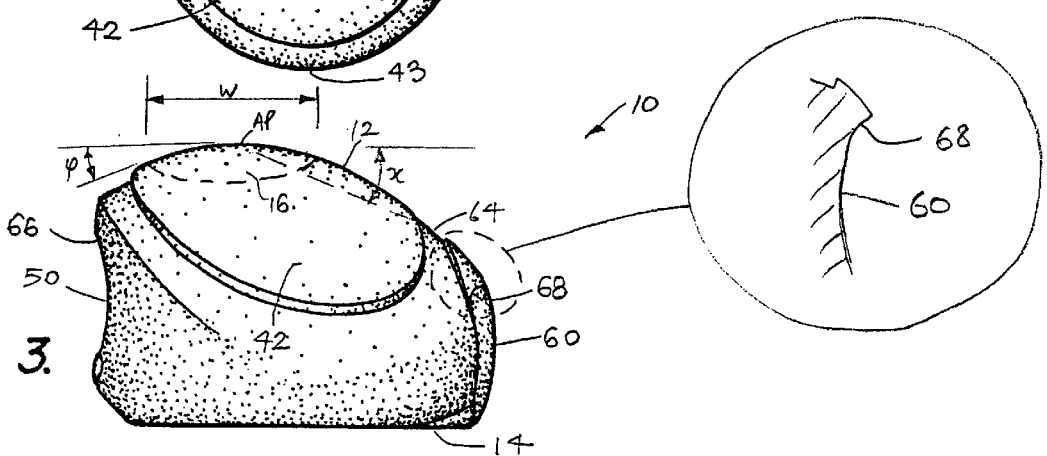
FIG. 3 is a front elevational view of the mouse device of FIG. 1.

Supporting the contact region 32 substantially at the MP joint of the second digit 22 and at least a portion of the MP joint of the third digit 23 on the crown 16 is advantageous because one of the more common repetitive tasks in operating the mouse 10 involves application of force via the second and/or third digits 22, 23, for instance, in pressing buttons provided in the front region 40. Most of the movement of those digits 22, 23 takes place about the MP joints. The crown 16 provides primary support from those MP joints toward the wrist 30. The crown 16 is desirably shaped to support a relatively wide contact region 32 as shown in FIG. 8 to provide even support and load distribution. The crown 16 is the relatively flat region of the upper surface 12, and may be defined by the angle relative to the bottom from the apex AP. For instance, the crown 16 may be defined as a region surrounding the apex AP and having an angle $\phi$ relative to the bottom 14 of less than about 10–25°, as illustrated in FIG. 3. The width W is typically about 1.25–2 inches.

Moreover, the transverse hump 47 provides support substantially at or near the MP joints of the fourth and fifth digits 24, 25 (and possibly a portion of the MP joint of the third digit 23). Forces may be applied via the MP joints of the fourth and fifth digits 24, 25 in gripping and moving the mouse 10. By supporting the hand 20 substantially at or near the MP joints of the digits 22–25, the crown 16 and the hump 47 reduce static loading on the joints of the hand 20 and allow the digits 22–25 to operate in a more neutral manner.

Figure 5:
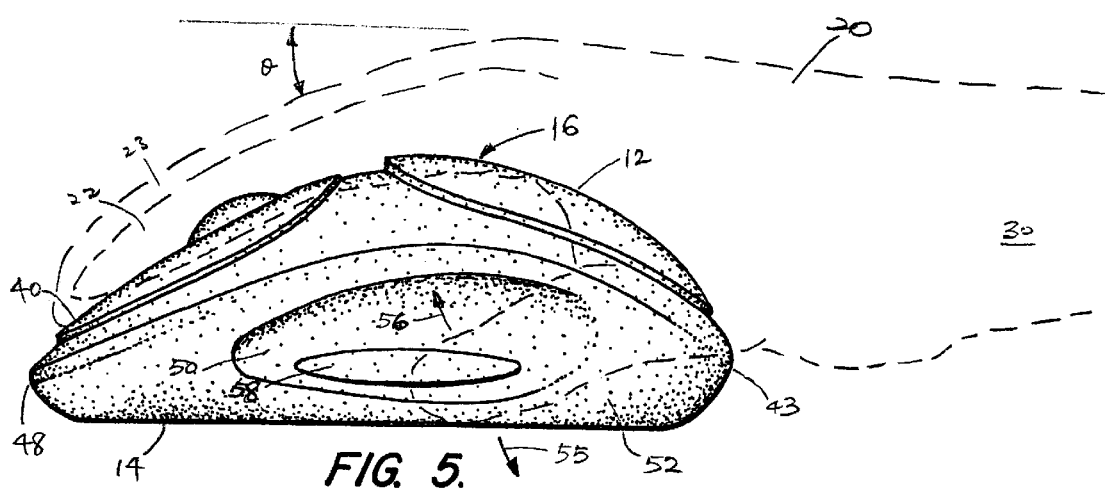
FIG. 5 is a left side elevational view of the mouse device of FIG. 1.

The crown 16 and the back region 42 of the upper surface 12 preferably are sufficiently high relative to the bottom 14 to maintain the wrist 30 of the user above the working surface on which the bottom 14 is disposed, as shown in FIG. 5. For example, the maximum height of the crown 16 is at least about 1.25 inches, more desirably about 1.5–1.75 inches. In conjunction with a downward slope in the front region 40 and outside region 46 from the crown 16 for supporting the second through fifth digits 22–25, the elevation of the wrist 30 promotes a near-neutral wrist position with little or no wrist extension, thereby reducing static loading at the wrist 30. Elevating the wrist 30 above the working surface prevents the application of pressure and loading against sensitive areas of the wrist 30 due to prolonged contact with the working surface. It also tends to limit side-to-side movement of the wrist 30 and encourage greater use of the forearm muscles in moving and operating the mouse 10. This further reduces physical stress on the wrist 30. In preferred embodiments, the wrist 30 is elevated above the working surface when the hand 20 is positioned with the contact region 32 resting over the crown 16, substantially regardless of the angle of the forearm relative to the working surface.

As shown in FIGS. 4 and 5, the upper surface 12 extends downwardly from the crown 16 toward the front region 40 gradually with a gentle slope, ending at a front edge 48 located near the bottom 14. The gentle slope of the front region 40 of the upper surface 12 and the elevational of the wrist 30 by the crown 16 and back region 42 support the hand 20 with a relatively small angle at the MP joints of at least the second and third digits 22, 23, and desirably also the fourth and fifth digits 24, 25. For example, as shown in FIG. 5, the angles $\theta$ at the MP joints between the carpals and the proximal phalanges of the second and third digits 22, 23 are approximately the same, and are typically between about 10° and 50° of MP flexion. In specific embodiments, the angle $\theta$ is about 20–40°. FIG. 5 shows a hand 20 resting on the mouse 10. Due to the gentle slope of the front region 40, the angle between the distal phalange and the carpal for each of the second and third digits 22, 23 is not significantly larger than the angle $\theta$ between the proximal phalange and the carpal.

The gentle angles at the MP joints of the digits 22–25 promote a relaxed posture of the hand 20 in the region of the MP joints by avoiding extreme positions of full extension (i.e., flat position) or extreme flexion (i.e., tight fist position) of the MP joints for the digits 22–25. This is desirable due to the repetitive movement and application of forces about the MP joints for operating mouse buttons with the second and/or third digits 22, 23 and lifting and moving of the mouse 10 with some or all of the digits 22–25.

In the specific embodiment shown, the back region 42 has a greater curvature in the rearward direction than the front region 40 in the forward direction, so that the upper surface 12 slopes downwardly more quickly in the back region 42 than in the front region 40, as best seen in FIGS. 4 and 5. For example, the maximum slope in the back region 42 may be about 70–80° at the back end 43, while the maximum slope in the front region 40 may be about 30–50° at the front end 48.

The back region 42 desirably has a sufficiently large curvature in the rearward direction (i.e., slopes downward sufficiently steeply) to substantially avoid contacting the carpal tunnel 36 of the user. For example, the back region 42 is configured to avoid contacting at least the middle and proximal portions of the carpal tunnel 36. In the embodiment shown, the distance from the crown 16 to the back end 43 is about ⅓ the total length of the mouse 10, while the maximum slope at the back end 43 is about 70–80°. The distance from the crown 16 to the front end 48 is about ⅔ the total length of the mouse 10, while the maximum slope at the front end 48 is about 30–50°. The length of the mouse 10 is typically about 4–5.5 inches. The large curvature in the back region 42 avoids adding pressure to the carpal tunnel 36. It is understood that the curvature necessary to substantially avoid contacting the carpal tunnel 36 depends on the size of the hand 20 and, more particularly, the distance between the contact region 32 and the carpal tunnel 36. For a given hand size or a range of hand sizes, the back region 42 can be configured with a sufficient curvature to substantially avoid contacting the carpal tunnel 36.

The crown 16 of the upper surface 12 desirably supports the MP joint of the second digit 22 and a portion of the MP joint of the third digit 23 such that the MP joint of the second digit 22 is slightly higher in elevation than the MP joint of the third digit 23. The decrease in elevation from the second MP joint to the third MP joint guides the hand away from full pronation (where the palm faces directly downward) toward a more neutral position with the palm tilted to face slightly inward to the left to reduce static loading. The transverse hump 47 at the outside region 46 of the upper surface 12 which supports the MP joints of the fourth and fifth digits 24, 25 and a portion of the MP joint of the third digit 23 is sloped downward. As a result, those MP joints are disposed at a lower elevation than the MP joint of the second digit 22. This decrease in elevation from the second MP joint generally along the transverse hump 47 allows the hand 20 to roll. As shown in FIG. 3, the crown 16 is sufficiently wide (e.g., the width W may be at least about 1–1.5 inches) and the curvature of the outside region 46 in the outward direction is sufficiently mild (e.g., the average angle χ from the apex AP to the edge of the outside region 46 relative to the bottom 14 may be less than about 20–40°), so that the hand 20 will not tend to slide off outwardly to the right. In a specific embodiment, the outside region 46 has a smaller curvature in the outward direction than the back region 42 of the upper surface 12 in the rearward direction.

As illustrated in FIGS. 1–7, the mouse device 10 includes an inner side surface 50 disposed on a side facing the thumb 21. The inner side surface 50 extends between the inside region 44 of the upper surface 12 and the bottom 14, and is generally perpendicular to the bottom 14. As shown in FIG. 5, the inner side surface 50 has a rearward portion 52 extending in the rearward direction toward the back of the mouse device 10 where the back region 42 of the upper surface 12 is located.

As best seen in FIGS. 1 and 2, the back of the mouse 10 is skewed outwardly to the right. The rearward portion 52 of the inner side surface 50 and the back region 42 of the upper surface 12 are formed to be located outwardly to the right of the thenar region 34 of the hand 20, so as to substantially avoid supporting the thenar region 34. As a result, the mouse 10 is shaped to create a "thenar void" to allow the thumb 21 to hang down in a substantially neutral thumb position and to move freely relative to the mouse 10 without interference from a thenar support provided in conventional mouse devices. The thenar region 34 is substantially free of pressure or loading that would otherwise be present if a thenar support were provided to support the thenar region 34. Thus, the back region 42 contacts and supports the hypothenar region 35 of the hand 20 as a hypothenar region support surface, but not the thenar region 34 or the carpal tunnel 36 except for incidental side contact with the thenar region 34.

Moreover, the upper surface 12 desirably is sufficiently high relative to the bottom, particularly at the crown 16 and in the back region 42, to allow the distal phalange 26 of the thumb 21 to rest on the working surface in a rest position between adduction and abduction when desired, as illustrated in FIG. 5. For example, the maximum height of the crown 16 is at least about 1.25 inches, more desirably about 1.5–1.75 inches. Abduction refers to a position of the thumb 21 that is away from and generally perpendicular to the plane of the palm of the hand 20. Adduction refers to a position where the thumb 21 lies generally on the plane of the palm and is oriented in a forward direction toward the front of the hand. Arrow 55 shows the movement of the thumb 21 toward abduction, and arrow 56 shows the movement of the thumb 21 toward adduction. Abduction of the thumb 21 occurs if the upper surface 12 positions the thenar region 34 too high above the working surface, while adduction occurs if the upper surface 12 positions the thenar region 34 too close to the working surface. Both abduction and adduction involve extreme positions in the range of posture for the thumb 21 with significant static loading, and are thus undesirable. The thumb 21 is involved in gripping and moving the mouse 10, and in operating a mouse button in some cases. It is advantageous to maintain the thumb 21 in a substantially neutral position to reduce static muscle loading on the thumb 21. To avoid the extreme positions of abduction and adduction, the thumb 21 is desirably maintained within an angle of about 20°–60° measured from the metacarpal bone of the second digit 22. In a specific embodiment, the device 10 supports the thumb 21 in a rest position that is approximately half-way between adduction and abduction.

As best seen in FIG. 5, the mouse 10 includes a first button which is a thumb button 58 located at a lower portion of the inner side surface 50 adjacent the bottom 14. The thumb button 58 is desirably disposed in a location near the distal tip of the thumb 21. In this way, the thumb 21 can activate the thumb button 58 with contact near the distal tip using a relatively small force. In addition, the thumb 21 tends to engage the middle or upper portion of the inner side surface when lifting and moving the mouse 10. Placing the thumb button 58 in the lower portion prevents the thumb 21 from accidentally activating the button 58.

As shown in FIGS. 2–4 and 6–7, an outer side surface 60 is disposed on the right side of the mouse 10 to face the distal phalange 26 of the fifth digit 25 (and possibly the fourth digit 24) of the hand 20. The outer side surface 60 extends between the outside region 46 of the upper surface 12 and the bottom 14, and is generally perpendicular to the bottom 14. The outer side surface 60 is provided to contact the fifth digit 25 and optionally the fourth digit 24 as well. The inner side surface 50 and outer side surface 60 allow the hand 20 to easily grip or pinch the mouse 10 for lifting and movement using the thumb 21 and the fifth digit 25 (and optionally the fourth digit 24). In the embodiment shown in FIGS. 2–4, the outside region 46 of the upper surface 12 includes a depressed or concave portion 64 for supporting the fourth digit 24 thereon adjacent the outer side surface 60. In this embodiment, the outer side surface 60 is configured to contact only the fifth digit 25. The depressed portion 64 provides stable support for the fourth digit 24.

Figure 6:
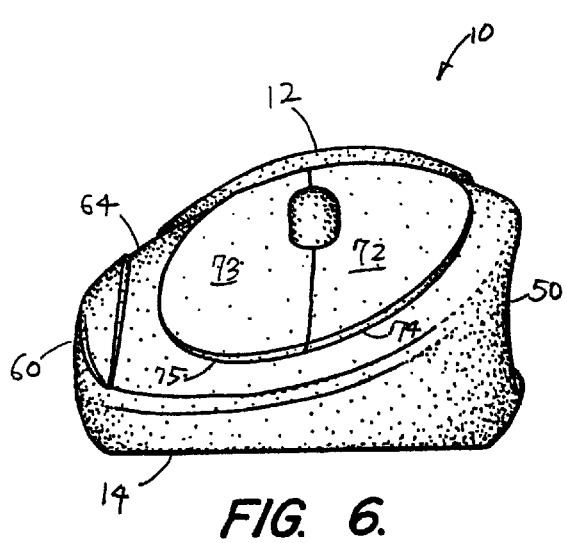
FIG. 6 is a rear elevational view of the mouse device of FIG. 1.
Figure 7:
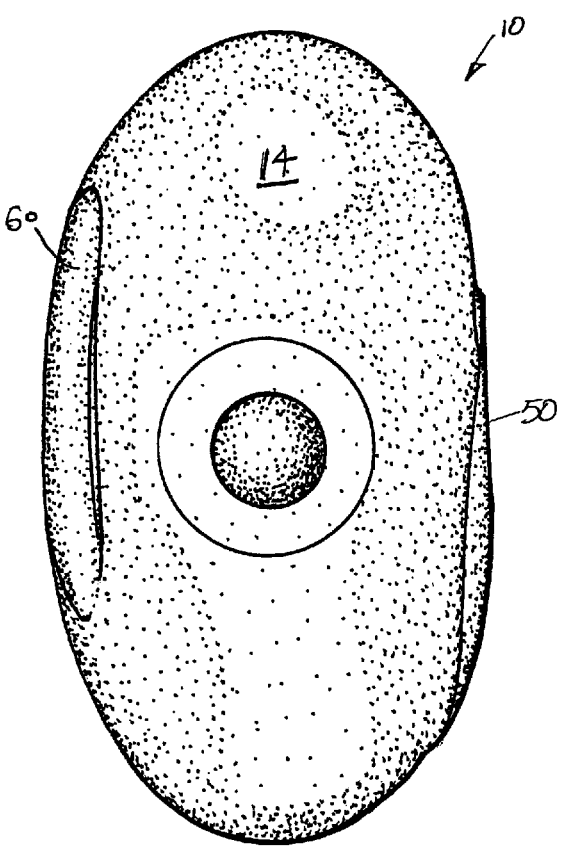
FIG. 7 is a bottom plan view of the mouse device of FIG. 1.

As shown in FIG. 3, the inner side surface 50 has an upper portion 66 adjacent the inside region 44 of the upper surface 12. The upper portion 66 of the inner side surface 50 has a region with an inverted slope which is inclined relative to the bottom 14 to face inwardly to the left and downwardly toward the distal phalange of the thumb 21. As shown in FIG. 6, the outer side surface 60 has an upper portion 68 adjacent the outside region 46 of the upper surface 12. The upper portion 68 of the outer side surface 60 has a region with an inverted slope which is inclined relative to the bottom 14 to face outwardly to the right and downwardly toward the distal phalange of the fifth digit. The inverted slopes of the upper portions 66, 68 of the inner and outer side surfaces 50, 60, respectively, allow the thumb 21 and fifth digit 25 (and possibly the fourth digit 24) to lift the mouse 10 without the need to apply a significant amount of gripping force by the digits 21 and 25 (and possibly digit 24) of hand 20. This reduces the force in the tissue of the hand from lifting and moving the mouse 10.

In a preferred embodiment, the mouse 10 is constructed with a center of gravity that lies between the contact point of the thumb 21 on the inner side surface 50 and the contact point of the fifth digit 25 on the outer side surface 60. In this way, the mouse 10 will remain level without tilting during lifting by the thumb 21 and the fifth digit 25, further reducing the need to apply a large gripping force to prevent tilting or to compensate for the tilting by pushing down on the front region 40 of the mouse by the second through fourth digits 22–24.

As shown in FIGS. 1, 2, and 6, the mouse 10 includes in the front region 40 of the upper surface 12 a second button 72 on which to place the second digit 22, and a third button 73 on which to place the third digit 23. The second button 72 is arranged to be generally aligned with the phalanges of the second digit 22, which are generally aligned with the axis of flexion of the MP joint of the second digit 22. The third button 73 is arranged to be generally aligned with the phalanges of the third digit 23, which are generally aligned with the axis of flexion of the MP joint of the third digit 23. Because the movements of the second and third digits 22, 23 are mainly around their respective MP joints, the general alignment allows the second and third digits 22, 23 to operate the buttons 72, 73 efficiently by pressing downward in a substantially neutral position, so that the movements of those digits 22, 23 are substantially along the axes of flexion of the respective MP joints. This avoids awkward or strained movements such as twisting or lateral movements of the digits 22, 23 (i.e., abduction or adduction) which may give rise to significant physical stresses. The buttons 72, 73 desirably are sufficiently long to accommodate a range of hand and finger sizes to allow them to operate the mouse 10 and buttons 72, 73 while positioning the MP joint of the second digit 22 and at least a portion of the MP joint of the third digit 23 substantially over the crown 16 of the upper surface 12.

The second and third buttons 72, 73 include forward edges 74, 75 that are disposed adjacent the front edge 48 of the housing of the mouse 10. The forward edges 74, 75 are desirably elevated above the front edge 48 of the mouse 10. This makes it easier to activate the buttons 72, 73 if the second and third digits 22, 23 extend past the forward edges 74, 75 of the buttons 72, 73. If the forward edges 74, 75 are not elevated above the front edge 48 of the mouse 10 but are instead flush with the front edge 48, the second and third digits 22, 23 will rest on the front edge 48. As such, it will be difficult to activate the buttons 72, 73 due to interference from the front edge 48.

Both the second and third buttons 72, 73 are lower in elevation than the crown 16. In the specific embodiment shown, the forward edges 74, 75 of the buttons 72, 73 are disposed near the bottom 14. The buttons 72, 73 may include depressed or indented contacts for more stable support of the digits 22, 23 and to reduce the likelihood of sliding of the hand 20 outwardly to the right off the upper surface 12 of the mouse 10.

The second and third buttons 72, 73 are arranged to contact at least portions of the middle phalange 27 of the second and third digits 22, 23, respectively. In one embodiment, the joints between the distal and middle phalanges 26, 27 of the second and third digits 23, 24, respectively, overlie the buttons 72, 73. Operating the buttons 72, 73 involves application of forces via the joints between the phalanges 26, 27 instead of the finger tips. Such contacts tend to distribute the loading to more muscles than contacts that are limited to the distal tips of the digits.

The second button 72 is pivotable around a second pivot or hinge and the third button 73 is pivotable around a third pivot or hinge relative to the housing of the mouse 10. The second and third pivots may be located near rearward edges 76, 77 of the second and third buttons 72, 73, respectively. In a preferred embodiment, the second pivot is located near the forward edge 74 of the second button 72 around which the rearward edge 76 of the second button 72 is pivotable. The third pivot is located near the forward edge 75 of the third button 73 around which the rearward edge 77 of the third button 73 is pivotable. Examples of hinges for the buttons can be found in commonly assigned U.S. patent application Ser. No. 09/408,089, filed Sep. 29, 1999, which is incorporated herein by reference in its entirety.

A user with a small hand will tend to contact the buttons 72, 73 near the rearward edges 76, 77 with the second and third digits 22, 23. The small hand typically is capable of exerting a smaller force than a large hand. Placing the pivots near the forward edges 74, 75 makes it easier for the second and third digits 22, 23 of the small hand to activate the buttons 72, 72 because of the large moment arms from the forward edges 74, 75 to the contact location near the rearward edges 76, 77. A user with a large hand will tend to contact the buttons 72, 73 along their entire lengths or substantially along their entire lengths up to near the forward edges 74, 75. Because the large hand typically can exert a larger force than a small hand, the second and third digits 72, 73 can activate the buttons 72, 73 readily without the need to rely on large moment arms provided to the small hand. As a result, the placement of the pivots or hinges near the forward edges 74, 75 benefits the user with a small hand without impairing the user with a large hand.

A wheel or roller 84 is disposed between the second and third buttons 72, 73. The roller 84 is supported to be rotatable relative to the housing of the mouse 10, for instance, on a shaft disposed inside the mouse 10. The roller 84 is typically configured to be manipulated by the second digit 22, and desirably is oriented to rotate generally along the phalanges of the second digit 22. The phalanges of the second digit 22 are generally aligned with the axis of flexion of the MP joint of the second digit 22. Because the movement of the second digit 22 is mainly around the MP joint, the general alignment allows the second digit 22 to operate the roller 84 efficiently in a substantially neutral position, so that the movement of the second digit 22 is substantially along the axis of flexion of its MP joint. This avoids awkward or strained movements which may cause significant physical stresses.

Alternatively, the roller 84 is oriented to rotate generally along the phalanges of the third digit 23 to be manipulated by the third digit 23. The roller 84 may also be oriented to rotate in a direction generally between the phalanges of the second digit 22 and the phalanges of the third digit 23 to allow operation with either the second or third digit 22, 23.

The configuration, contours, and slopes of the mouse 10 as illustrated in FIGS. 1–7 are merely illustrative of a specific embodiment of the invention. It is appreciated that modifications can be made while still achieving the objects of the invention.

FIGS. 9–12 show a mouse 110 according to another embodiment. The mouse 110 is substantially similar to the mouse 10 of FIGS. 1–7, and includes a contoured upper surface 112, a bottom 114, and a crown 116. The crown 16 in this embodiment is clearly demarcated by a discontinuity in slope from the surrounding area of the upper surface 112. A inner side surface 120 is provided to contact the thumb 21, and an outer side surface 122 is provided to contact the fifth digit 25 and optionally the fourth digit 24.

As shown in FIGS. 9–12, the mouse 110 does not have the depressed or concave portion 64 for supporting the fourth digit 24 as shown in FIGS. 2–4 for the mouse 10. In addition, the inner side surface 120 has an upper portion 124 having a lip 126 with a downward facing surface which is generally parallel to the bottom 114 to allow the thumb 21 to contact for convenient lifting and movement of the mouse 110. The outer side surface 122 also has an upper portion 128 having a lip 130 with a downward facing surface which is generally parallel to the bottom 114 to allow the fifth digit 25 (and possibly the fourth digit 24) to contact for convenience lifting and movement of the mouse 110. The configuration of the lips 126, 130 reduces the amount of forces needed for the thumb 21 and fifth digit 25 (and possibly the fourth digit 24) to lift and move the mouse 110, thereby diminishing the amount of repetitive stresses in the hand in manipulating the mouse 110.

The principles of the present invention can be used for constructing mouse devices for hands of different sizes. For example, the shape of the mouse can be scaled up or down without substantial alterations to the relative angles and relative dimensions. The length of the mouse from the front end to the back end may be adjusted according to the distance between the tip of the third index 23 and a point 150 near the middle of the triangular area of the hand 20 encircled by the thenar region 34, the hypothenar region 35, and the contact region 32, as shown in FIG. 8. For instance, the length of the mouse may be equal to about 0.9–1.1 times the distance between the tip of the third index 23 and the point 150. In addition, the internal components may stay the same, so that only the housing is replaced. The internal components may be mounted onto the bottom, and only the upper portion of the housing need be replaced. The upper portion may comprise a shell that is detachably connected to the bottom. Furthermore, the finger-operated buttons may remain unchanged. In that case, the detachable shell includes openings to expose the buttons upon being connected to the bottom.

The above-described arrangements of apparatus and methods are merely illustrative of applications of the principles of this invention and many other embodiments and modifications may be made without departing from the spirit and scope of the invention as defined in the claims. For instance, the number and configuration of the finger-operated pointing members provided on the device may be modified. An example of an arrangement with the roller supported on a middle button spaced between the two buttons can be found in U.S. patent application Ser. No. 09/408,089, filed Sep. 29, 1999. The scope of the invention should, therefore, be determined not with reference to the above description, but instead should be determined with reference to the appended claims along with their full scope of equivalents.

What is claimed is:

1. A pointing device for use on a working surface, the device comprising a housing which includes:
    a bottom configured to be placed on the working surface;
    at least one finger-operated pointing member; and
    an upper surface including a crown for contacting a palmar region of the palm of the hand of a user substantially at the metacarpal-phalangeal joint of the second digit and at least a portion of the metacarpal-phalangeal joint of the third digits, the crown being higher in elevation than remaining portions of the upper surface relative to the bottom, the upper surface extending from the crown downwardly in a forward direction toward the tips of the second and third digits to form a front region, downwardly in a rearward direction toward the wrist of the user to form a back region, and downwardly in an outward direction toward the metacarpal-phalangeal joints of the fourth and fifth digits to form an outside region, the back region being formed to be located outwardly of the thenar region of the palm to support the hypothenar region of the palm and to substantially avoid supporting the thenar region with the user's hand being supported on the upper surface to operate the at least one finger-operated pointing member with at least one of the user's digits.

2. The device of claim 1 wherein the crown and the back region of the upper surface are sufficiently high relative to the working surface to maintain the wrist above the working surface.

3. The device of claim 1 wherein the upper surface extends from the crown downwardly in an inward direction toward the thumb to form an inside region, herein the housing further includes an inner side surface disposed on a side to face the thumb, the inner side surface extending between the inside region of the upper surface and the bottom, the inner side surface being generally perpendicular to the bottom, the inner side surface having a rearward portion extending toward the wrist, the rearward portion of the inner side surface and the back region of the upper surface being formed to be located outwardly of the thenar region of the palm to substantially avoid contacting the thenar region.

4. The device of claim 3 wherein an upper portion of the inner side surface adjacent the inside region of the upper surface has a region with an inverted slope which is inclined relative to the bottom to face inwardly and downwardly toward the distal phalange of the thumb.

5. The device of claim 3 wherein an upper portion of the inner side surface adjacent the inside region of the upper surface includes a lip with a downward facing surface which is generally parallel to the bottom to face downwardly toward the distal phalange of the thumb.

6. The device of claim 1 wherein the upper surface has a height to support the hand relative to the working surface in a manner to allow the distal phalange of the thumb to rest on the working surface between adduction and abduction.

7. The device of claim 6 wherein the at least one finger-operated pointing member comprises a first button disposed on a lower portion of the inner side surface adjacent the bottom.

8. The device of claim 6 wherein the at least one finger-operated pointing member comprises a first button disposed in a location to be near the tip of the thumb.

9. The device of claim 1 wherein the housing further comprises an outer side surface disposed on a side to face the distal phalange of the fifth digit of the hand, the outer side surface extending between the outside region of the upper surface and the bottom, the outer side surface being generally perpendicular to the bottom.

10. The device of claim 9 wherein an upper portion of the outer side surface adjacent the outside region of the upper surface has a region with an inverted slope which is inclined relative to the bottom to face outwardly and downwardly toward the distal phalange of the fifth digit.

11. The device of claim 9 wherein an upper portion of the outer side surface adjacent the outside region of the upper surface includes a lip with a downward facing surface which is generally parallel to the bottom to face downwardly toward the distal phalange of the fifth digit.

12. The device of claim 9 wherein the outside region of the upper surface includes a depressed or concave portion for supporting the fourth digit thereon adjacent the outer side surface.

13. The device of claim 1 wherein the at least one finger-operated pointing member comprises in the front region of the upper surface a second button on which to place the second digit and a third button on which to place the third digit, the second button being arranged to be generally aligned with the phalanges of the second digit, the third button being arranged to be generally aligned with the phalanges of the third digit.

14. The device of claim 13 wherein the second and third buttons have forward edges which are disposed adjacent a front edge of the housing and which are elevated above the front edge of the housing.

15. The device of claim 13 wherein the second button is pivotable around a second pivot relative to the housing and the third button is pivotable around a third pivot relative to the housing, the second pivot being located near a forward edge of the second button around which a rearward edge of the second button is pivotable, the third pivot being located near a forward edge of the third button around which a rearward edge of the third button is pivotable.

16. The device of claim 13 wherein the at least one finger-operated pointing member comprises a roller disposed between the second button and the third button, the roller being rotatable relative to the housing, the roller being oriented to rotate generally along the phalanges of the second digit.

17. The device of claim 1 wherein the outside region of the upper surface includes a transverse hump extending from the crown in the outward direction for contacting a palmar region of the palm of the hand substantially at the metacarpal-phalangeal joints of the fourth and fifth digits.

18. The device of claim 1 wherein the back region has a greater curvature in the rearward direction than the outside region in the outward direction.

19. The device of claim 1 wherein the back region has a greater curvature in the rearward direction than the front region in the forward direction.

20. The device of claim 1 wherein the back region has a sufficiently large curvature in the rearward direction to substantially avoid contacting the carpal tunnel region of the palm.

21. A computer mouse device for use on a working surface, the device comprising a housing which includes a bottom and an upper surface, the upper surface including:

a crown on which to rest a palmar region of the palm of the hand of a user substantially at the metacarpal-phalangeal joint of the second digit and at least a portion of the metacarpal-phalangeal joint of the third digit, the crown being higher in elevation than remaining portions of the upper surface relative to the bottom;

a back region on which to rest the hypothenar region of the hand, the back region extending downwardly from the crown in a rearward direction and being configured to substantially avoid contacting the carpal tunnel of the hand; and a front region extending downwardly from the crown in a forward direction, the front region including a second digit button on which to place the second digit and a third digit button on which to place the third digit, the second button being arranged to be generally aligned with the phalanges of the second digit, the third button being arranged to be generally aligned with the phalanges of the third digit.

22. The device of claim 21 wherein the housing further comprises an inner side surface on which to place the thumb, and a thumb button disposed on a lower portion of the inner side surface adjacent the bottom to be near the tip of the thumb.

23. The device of claim 21 wherein the housing further comprise a transverse hump on which to rest a palmar region of the palm of the hand substantially at the metacarpal-phalangeal joints of the fourth and fifth digits, the transverse hump extending from the crown in an outward direction, wherein the back region has a greater curvature in the rearward direction than the transverse hump in the outward direction.

24. A pointing device for use on a working surface, the device comprising a housing which includes a bottom, an upper surface, and at least one finger-operated pointing member, the upper surface including:

a crown on which to rest a palmar region of the palm of the hand of a user substantially at the metacarpal-phalangeal joint of the second digit and at least a portion of the metacarpal-phalangeal joint of the third digit, the crown being higher in elevation than remaining portions of the upper surface relative to the bottom;

a transverse hump on which to rest a palmar region of the palm of the hand substantially at the metacarpal-phalangeal joints of the fourth and fifth digits, the transverse hump extending from the crown in an outward direction;

a front region on which to rest the second and third digits, the front region extending downwardly from the crown in a forward direction; and a back region on which to rest the hypothenar region of the hand, the back region extending downwardly from the crown in a rearward direction and being configured to substantially avoid contact with the carpal tunnel of the hand.

25. The device of claim 24 wherein the front region has a curvature in the forward direction to support the second and third digits so that the metacarpal-phalangeal joints of the second and third digits have angles between about 10° and about 50° of metacarpal-phalangeal flexion.

26. The device of claim 24 wherein crown and the back region of the upper surface are sufficiently high relative to the bottom to allow the thumb to hang in a position between abduction and adduction during operation of the device.

27. The device of claim 24 wherein the transverse hump extends from the crown downwardly to guide the hand away from full pronation.

28. The device of claim 24 wherein the back region has a greater curvature in the rearward direction than the front region in the forward direction.

29. The device of claim 24 wherein the housing further includes:

an inner side surface on which to place the thumb; and an outer side surface on which to place the fifth digit.

30. The device of claim 29 wherein an upper portion of the outer side surface has an inverted surface portion with an inverted slope which is inclined relative to the bottom to face outwardly and downwardly toward the distal phalange of the fifth digit, wherein an upper portion of the inner side surface has an inverted surface portion with an inverted slope which is inclined relative to the bottom to face inwardly and downwardly toward the distal phalange of the thumb, and wherein the device has a center of gravity disposed between the inverted surface portion of the inner side surface and the inverted surface portion of the outer side surface.

31. The device of claim 29 wherein the upper surface, the inner side surface, and the outer side surface are detachably coupled to the bottom.

32. The device of claim 31 wherein the upper surface, the inner side surface, and the outer side surface are formed as a shell that is detachably coupled to the bottom.

33. The device of claim 32 wherein the bottom is adapted to be connected with shells of different sizes to accommodate differently sized hands.

* * * * *